United States Patent [19]

Hammill

[11] 3,722,797
[45] Mar. 27, 1973

[54] CONVERGENT-DIVERGENT EJECTOR EXHAUST NOZZLE

[75] Inventor: William R. Hammill, Van Nuys, Calif.

[73] Assignee: CCI Aerospace Corporation, Van Nuys, Calif.

[22] Filed: Nov. 4, 1970

[21] Appl. No.: 86,728

[52] U.S. Cl. ...239/265.17, 239/265.19, 239/265.37, 239/265.41
[51] Int. Cl. ..........................B63h 25/46, B64c 15/10
[58] Field of Search.......239/265.17, 265.19, 265.33, 239/265.37, 265.39, 265.41, 437, 451; 60/271

[56] References Cited

UNITED STATES PATENTS

| 2,697,907 | 12/1954 | Gaubatz | 239/265.39 |
| 3,598,319 | 8/1971 | Howald et al. | 239/265.19 |
| 3,610,533 | 10/1971 | Johnson et al. | 239/265.37 X |
| 3,424,384 | 1/1969 | Lacombe | 239/265.39 |
| 3,511,441 | 4/1970 | Tumicki | 239/265.39 X |
| 3,062,003 | 11/1962 | Hamilton | 239/265.41 X |
| 3,390,837 | 7/1968 | Freeman | 239/265.41 X |
| 3,439,504 | 4/1969 | Logerot et al. | 239/265.41 X |
| 3,057,150 | 10/1962 | Horgan | 239/265.41 X |
| 2,984,068 | 5/1961 | Eatock | 239/265.41 X |
| 3,432,100 | 3/1969 | Hardy et al. | 239/265.37 X |

FOREIGN PATENTS OR APPLICATIONS

| 517,169 | 2/1955 | Italy | 239/265.39 |

*Primary Examiner*—Lloyd L. King
*Attorney*—Robert E. Geauque

[57] ABSTRACT

A variable exhaust nozzle for an air breathing propulsion system having an independently actuable convergent-divergent iris leaf section surrounding a fixed cut-off plug, a self-actuating blow in door assembly located within the exterior nozzle shell adjacent the convergent section.

7 Claims, 7 Drawing Figures

INVENTOR.
WILLIAM R. HAMMILL
BY R.E. Geangue
ATTORNEY

Patented March 27, 1973

INVENTOR.
WILLIAM R. HAMMILL
BY R. E. Seangue
ATTORNEY

Patented March 27, 1973 3,722,797

INVENTOR.
WILLIAM R. HAMMILL
BY R.E. Geaugue
ATTORNEY

CONVERGENT-DIVERGENT EJECTOR EXHAUST NOZZLE

BACKGROUND OF THE INVENTION

The field of this invention relates to jet-propulsion engines and more specifically to a nozzle which directs the flow of expanding gases from the combustion chamber of the engine into the ambient.

It is the purpose of the jet nozzle to convert the potential energy of the expanding gases within a jet engine into kinetic energy. High temperature, high pressure gas escapes through the nozzle, expanding in volume as the gas drops in pressure and temperature, thus gaining rearward velocity and momentum. It is well known that for maximum nozzle efficiency, the pressure of the expanding gases leaving the nozzle should be at the same pressure as the ambient.

For a propulsion system in which the pressure of the expanding gases is nor more than approximately twice the absolute ambient pressure, a converging nozzle is usually employed. The type of engine which usually requires the converging nozzle is what is frequently referred to as the turbo-jet. For subsonic flight of the turbo-jet, a converging jet nozzle of fixed dimensions is usually employed. For propulsion systems in which the expanding gases are high compared to ambient pressure, a converging-diverging nozzle is normally employed. For supersonic flight of a turbo-jet engine, normally a converging-diverging nozzle is employed. However, in the low supersonic flight regime, it is only desirable to slightly restrict the throat area of the nozzle.

As the engine velocity increases into higher supersonic velocities, it is desirable to additionally restrict the throat area of the nozzle. Some engines have employed the use of ejectors which may require a blow-in door adjacent the nozzle to supply external air into the nozzle. The ejector basically performs similar to a rocket engine in that additional mass is supplied within an engine as well as additional thrust.

For the turbo-jet engine a simple convergent-divergent iris leaf nozzle will be satisfactory to satisfy the limiting operating requirements of the engine. For the ram-jet type of engine, a fixed geometry restrictive throat area convergent-divergent nozzle has been found to be most satisfactory. For a ram-jet engine which employs the use of an ejector, the aforesaid nozzle structure for the ram-jet is usually employed in combination with a blow-in door assembly. However, in an engine which operates within a wider operating range (subsonic to hypersonic speeds), no single nozzle structure previously described will be able to satisfy the requirements of such an engine.

It would be most desirable to design an engine which would operate efficiently not only at the subsonic flight but also at supersonic flight as well as hypersonic. For such an engine to operate efficiently, a novel structure will have to be employed which effectively exits the working fluid of the engine into the ambient at approximately the same pressure of the ambient during all flight regimes.

SUMMARY OF THE INVENTION

The novelty of the nozzle structure of this invention relates to the unique combination of three types of nozzles into a single design which minimizes their individual deficiencies and maximizes their advantages. To accomplish this, the nozzle of this invention is designed around a fixed central plug which permits maximum throat area variation of the nozzle exit area. The convergent-divergent iris leaf section surrounds the plug to form a main portion of the nozzle. The convergent and divergent portions of the nozzle can be actuated independently or interdependently. The throat area of the nozzle in all cases is formed between the maximum diameter of the plug and the "free" end of the convergent section. The outside nozzle shell is the major structural supporting member for the leaves of both the convergent and divergent portions of the nozzle. The blow-in doors are located in the shell adjacent the convergent section. The doors are self-actuating units which open when the doors' internal pressures are lower than the external pressures.

The primary features of the nozzle of this invention is as follows: Achieves maximum throat area variation, relatively short nozzle length, employs the use of existing state of the art components, all nozzle structure is air-cooled, most efficient in all flight regimes of the aircraft, and the actuating movement to effect movement of the convergent-divergent sections of the nozzle is physically short thereby requiring less actuating structure.

DETAILED DESCRIPTION OF THE SHOWN EMBODIMENT

Figure 1:
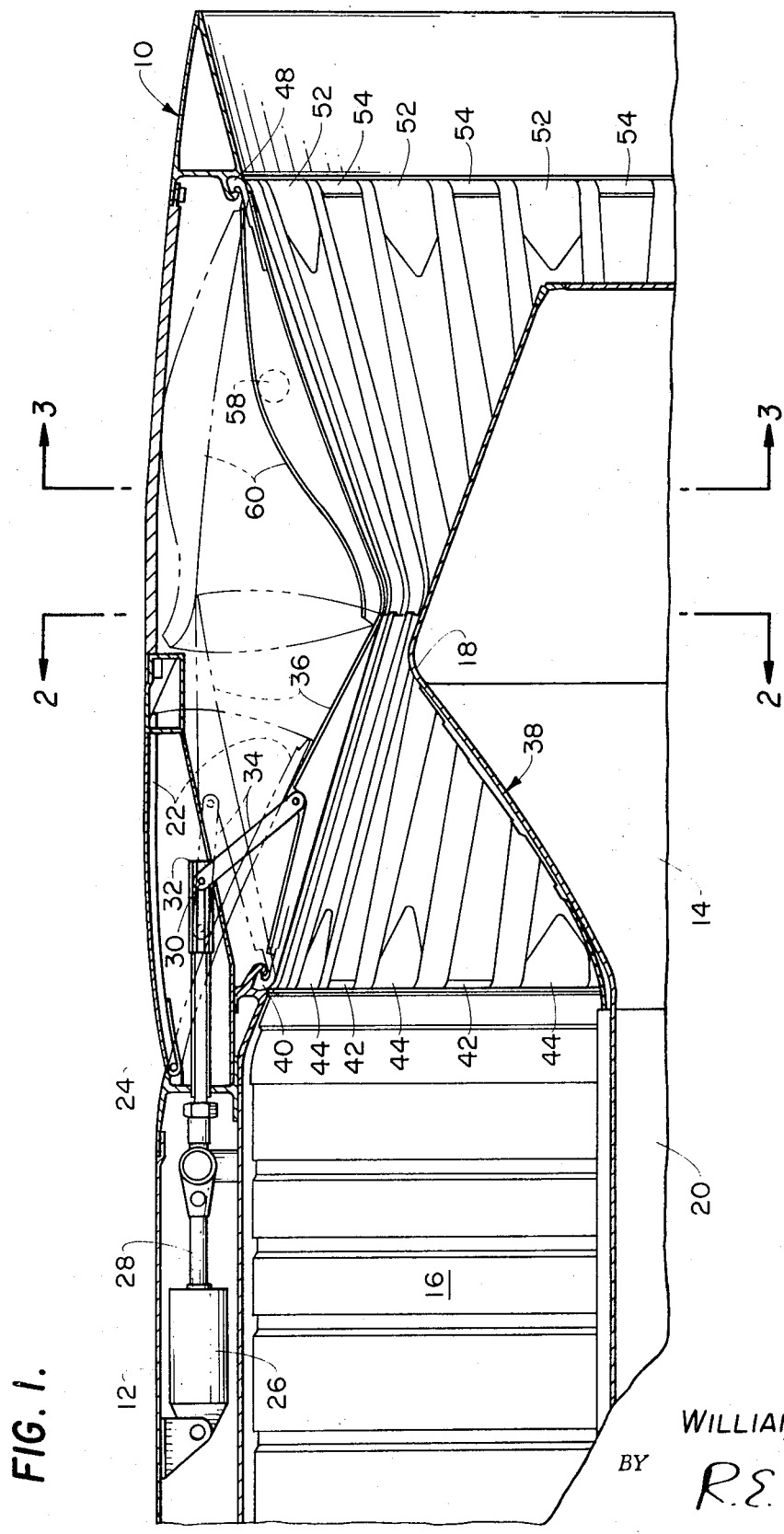
FIG. 1 is a longitudinal sectional view of the nozzle structure of this invention.
Figure 2:
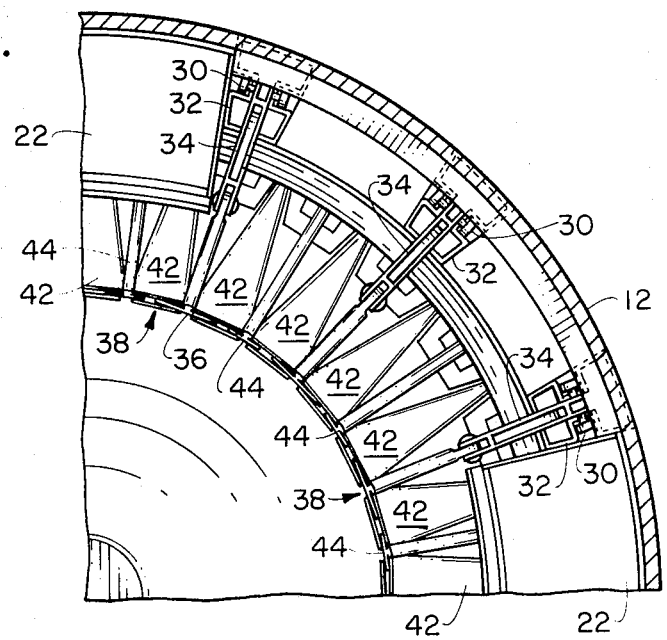
FIG. 2 is a sectional view through the convergent portion of the nozzle of this invention taken along line 2—2 of FIG. 1.
Figure 3:
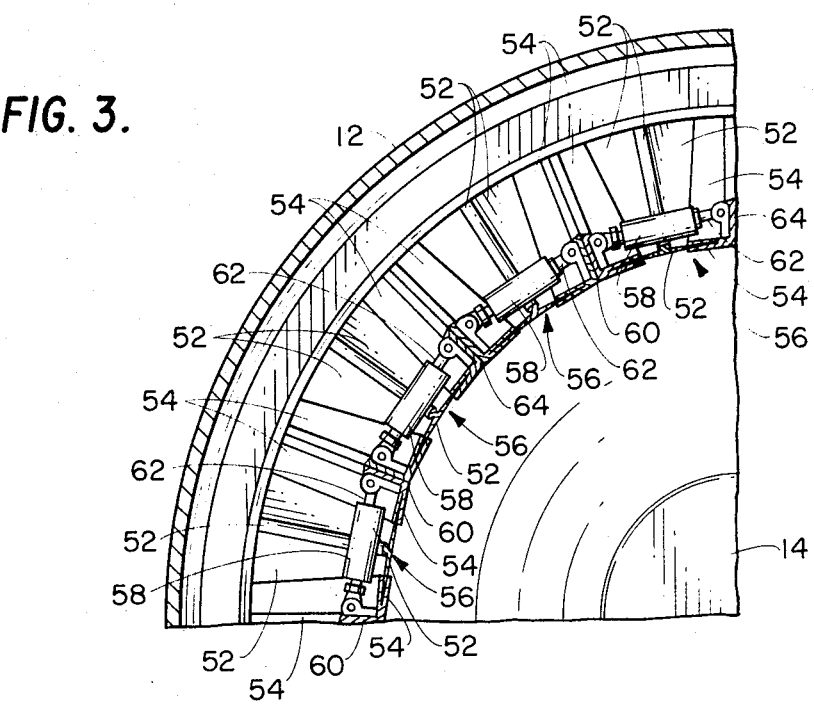
FIG. 3 is a sectional view through the divergent portion of the nozzle structure of this invention taken along line 3—3 of FIG. 1.

Referring particularly to the drawings, there is shown the exhaust nozzle 10 of this invention having a cylindrical outer shell 12 and a central fixedly located cut-off plug 14. The shell 12 is to surround the plug 14. It is to be understood that the exhaust nozzle 10 of this invention is to be incorporated on the aft end of a combustion chamber 16 of an air breathing propulsion system such as an aircraft engine. The main portion of the engine would be located upstream of the combustion engine 16. It is not believed necessary to describe the details of the engine as such engines are conventional and well known in the art taking the form of a ram-jet, turbojet, turbo-fan-ejector ram-jet, or the like. Actually, the nozzle 10 of this invention, because of its wide Mach number range, is most useable with a combination type of engine employing the features of the separate engines into a single unit.

Cut-off plug 14 has a raised portion 18 which is common and is normally employed to facilitate proper conducting of the expanding gases in the combustion chamber 16 to the ambient. The plug 14 is fixedly secured to a center body 20 which is fixedly positioned to a portion of the engine structure (not shown).

Figure 7:
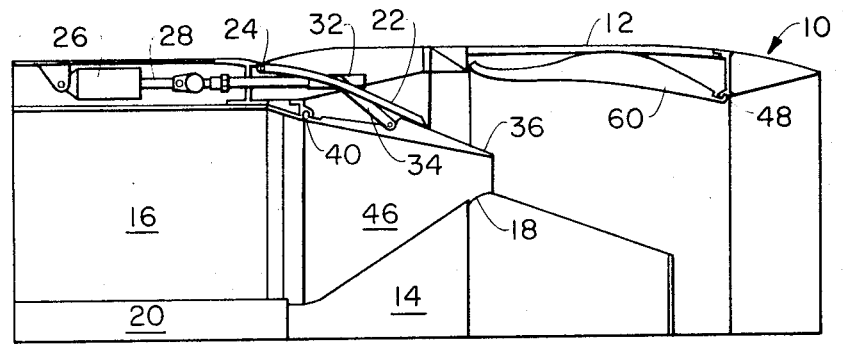
FIG. 7 is a schematic view similar to FIG. 4 but showing the components of the nozzle in the position of low speed, low thrust of the aircraft.

Located about the periphery of the shell 12 are a plurality of blow-in doors 22. Each of the doors is hingedly connected by a hinge pin 24 to the shell 12. It is envisioned that a plurality of such doors (such as four) be located about the periphery of the shell, such doors taking up less than fifty percent of the circumference of the shell. Each of the doors 22 is to be movable between a closed position, as shown in FIG. 1 of the drawings, to a fully open position, as shown in FIG. 7 of the drawings. With each of the doors 22 in the closed position, external air from the ambient is not permitted entrance within the exhaust nozzle 10. However, with the doors in the open position, entrance of the ambient air is permitted. Each of the doors 22 is to be automatically actuated by a pressure differential on each side of the door. In other words, if the ambient air pressure is greater than the air pressure within the nozzle 10, the doors 22 will be permitted to open, permitting entry of the ambient air.

Secured to shell 12 is a first actuator assembly. It is to be understood that there intends to be a plurality of separate actuator units 26 within the first actuator assembly located about the periphery of the shell 12. However, within the drawings, for illustrative purposes, only two such actuator units 26 are shown, it being understood that the not shown actuator units 26 operate in the same manner as the shown actuator units 26, and in actual practice all units 26 operate simultaneously. The actuator 26 of the first actuator assembly is capable of effecting longitudinal movement of actuator rod 28 which is connected to a roller assembly 30. The roller assembly 30 is capable of longitudinal movement within a guide 32. Roller assembly 30 is in turn connected to linkage arm 34. Linkage arm 34 is to be pivotally connected to a center leaf 36 of a convergent leaf assembly 38. Center leaf 36 is pivotally connected by a hinge ring 40 to a portion of the shell 12. Also, pivotally connected on each side of each center leaf 36 are side leaves 42. The center leaf 36 is fixedly secured to the side leaves 42. Each of the side leaves 42 are formed of upper and lower spaced apart plates. Between each of the plates is located an element of a movable center leaf 44. It is to be noted that in the upstream direction the side leaves 42 converge in physical size as do to a lesser degree the edges of the movable center leaves 44. The resulting structure of the center leaves 36, the side leaves 42 and the movable center leaf 44 connect together to form a continuous surface resembling a truncated cone. As the leaves are hinged about the hinge ring 40, the free end of each of the leaves is movable either radially outward or radially inward with respect to plug 14. This type of what is frequently termed iris leaf construction is conventional in the design of nozzles and need not be explained here in further detail. It is only necessary that it is understood that movement of actuator rod 28 by means of the actuator units 26 causes pivotal movement of the leaves about the hinge ring 40 so that restriction of gas passage 46 results. Retraction of actuator rod 28 within the actuator assembly 26 tends to move the free end of the leaves 42, 44 and 36 adjacent the shell 12, thereby widening the gas passage 46.

Pivotally connected by hinge ring 28 is a divergent leaf assembly comprising center leaves 52 being similarly movable within side leaves 54. It is to be understood that the side leaves 54 combined with the center leaves 52 are similarly shaped with respect to leaves 36 and 42. The free end of the leaves 52 and 54 is to be in an exteriorly abutting relationship with the free end of the leaves 36, 42 and 44, as shown in the drawings. It is to be understood that again a continuous truncated cone-like surface is to be formed by connecting together the leaves 52 and 54 in a continuous relationship. Again, the free end of the divergent leaf assembly is to be movable from a position adjacent plug 14 through a position directly adjacent shell 12. This movement is effected by second actuator assembly 56 comprising individual actuator units 58. Each of the actuator units 58 are to be actuated simultaneously by appropriate structure conventional in the art, not shown here. Each of the actuator units 58 are fixedly connected to a first brace plate 60 with the movable actuator rod 62 being pivotally connected to a second brace plate 64. The actuator units 58 are located between adjacent brace plates 60 and 64 along the entire circumference of the divergent leaf assembly 50. Again, the structure of the divergent leaf assembly 50 and the associated second actuator assembly 56 is conventional and need not be described here in detail. It is well known that upon extension of actuator rod 62 of the actuator units 58, the free end of the divergent leaf assembly 50 tends to move toward the shell 12. Upon contraction of the actuator rod 62 within the actuator assembly 56, the free end of the divergent leaf assembly tends to move toward the fixed plug 14.

Heretofore, most variable iris leaf nozzle configurations were designed without the inclusion of a fixed cut-off plug. As a result, the nozzle area could only be minimally restricted to approximately 25 percent of the total area. The inventor of the nozzle structure of this invention determined that, if such a variable iris leaf configuration were employed with a fixed cut-off plug, the area of the nozzle could be restricted to approximately ten percent of the total nozzle area. Also, at the same time, the maximum nozzle area is greatly increased using a plug versus not using a plug. In other words, greater versatility of the nozzle is permitted. Such an arrangement is most desirable because in certain flight modes, the largest possible mass flow through the nozzle is desired, while in other flight modes an extremely minimal mass flow through the nozzle is desired.

Figure 4:
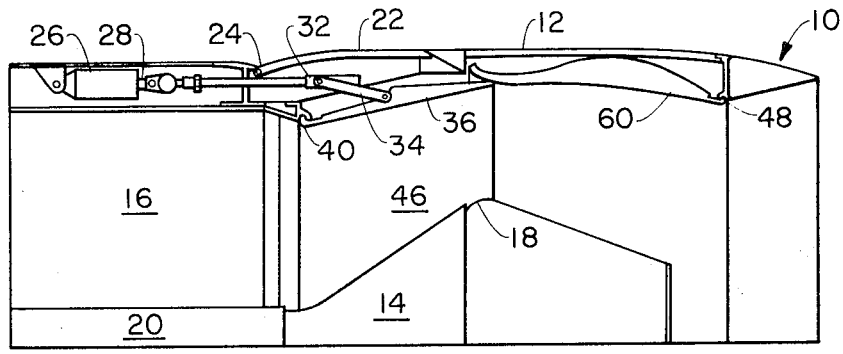
FIG. 4 is a schematic view of the nozzle of this invention with the separate components of the nozzle in the position of high thrust but low speed of the aircraft.

The operation of the nozzle 10 of this invention is as follows: It is believed that the operation of the nozzle 10 of this invention will be best described in relation to specific flight modes of the aircraft through which the engine is being operated. Referring particularly to FIG. 4 of the drawings, the convergent leaf assembly 38 and the divergent leaf assembly 50 are located in the really outwardmost position so that maximum mass flow is permitted through the passage 46. The blow-in doors 22 are closed, not permitting entrance of ambient air into passage 46. This maximum non-restrictive type of throat is desirable during periods of high thrust but at low speed which normally occurs at low altitude. A typical flight mode in which such large open throat position would be desired would be take-off of the aircraft.

Figure 5:
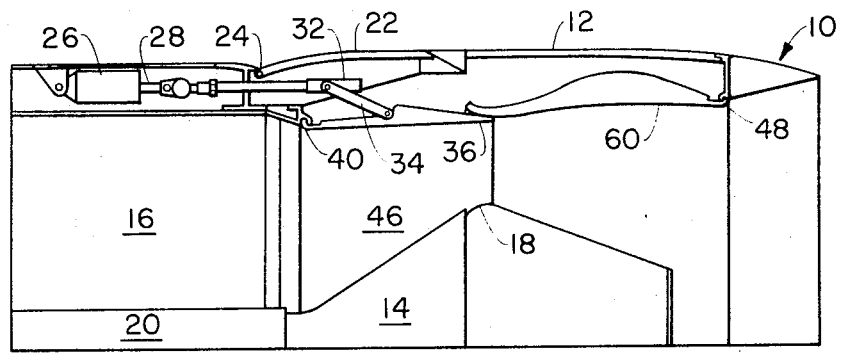
FIG. 5 is a schematic view similar to FIG. 4 but showing the components of the nozzle in the position for medium supersonic speed of the aircraft.

Upon the aircraft moving into higher velocities such as low multiple Mach number supersonic flight, the intermediate throat position of FIG. 5 would be employed. In the intermediate throat position, the convergent leaf assembly 38 has been moved so that it is substantially parallel to the outside shell 12. Also, the divergent leaf assembly 50 is moved also to a similar position. Again, blow-in doors 22 remain closed as the pressure within the nozzle 10 is greater than the ambient air pressure, permitting such to not open.

Upon the aircraft moving into hypersonic velocities, which would normally occur at high altitude, minimum restriction of the passage 46 is desired, causing the convergent leaf assembly 38 to remove adjacent plug 14. Also, divergent leaf assembly 50 is likewise moved adjacent plug 14. In this position the pressure within the passage 46 is greater than the ambient air pressure, thereby maintaining the blow-in doors 22 in the closed position. The minimum amount of mass flows through passage 46.

Figure 6:
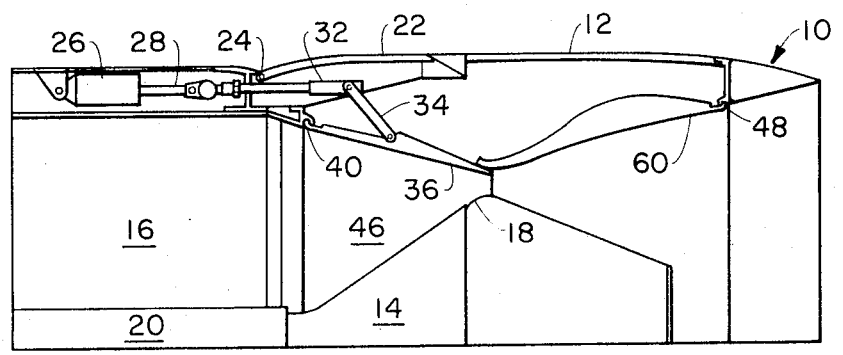
FIG. 6 is a view similar to FIG. 4 but showing the nozzle components in the position for hypersonic velocity of the aircraft.

Referring particularly to FIG. 7 of the drawings, the position of the nozzle would be what would normally occur during loiter of the aircraft. Loiter would be at low altitude with the aircraft traveling at low velocity and lingering, as above a landing field prior to landing. The convergent leaf assembly 38 is substantially in the same position of FIG. 6 in that substantial restriction of passage 46 is effected. However, the divergent leaf assembly 50 is in the extended position with the free end thereof adjacent shell 12. The pressure within the passage 46 is at a lower value than the ambient air pressure which causes the blow-in doors 22 to move to the open position permitting entry of the ambient air into passage 46. In other words, the gases being conducted from the combustion chamber 16 of the engine are restricted by means of the convergent leaf assembly 38 but then are intermixed with ambient air from the blow-in doors 22 prior to being discharged past the divergent leaf assembly 50 to the ambient.

Although the foregoing description of the positions are what would normally occur, variations of the positions may result in actual practice. Also, the optimum movement in each position was described for purposes of illustration. However, it is to be understood that in most cases, other than optimal movement will be effected. Further, in other flight modes of the aircraft, there will be other positions of the nozzle assembly 10 of this invention. In other words, applicant does not desire to be limited to only the positions described and to the particular limit of the positions described.

In actual practice, the movement of the nozzle assembly 10 of this invention will be effected automatically through a control system far too complex for description within this application. The function of the control system would be to determine the particular flight mode of the aircraft and to modify the nozzle position accordingly. Further, in certain instances it may be desirable upon initiation of a change of flight mode for the control system, to likewise initiate a change in the nozzle position prior to the arriving at the particular flight mode.

All parts of the nozzle of this invention are air film cooled up to a flight Mach number where the temperature of the coolant air-nozzle structure exceeds the temperature limits of the structural material. Regenerative cooling of the nozzle of this invention would be difficult. The plug is cooled with a cooling liner which extends into the passage 46. The convergent leaf assembly 38 is cooled by an air film emerging from a liner which ends at the hinge ring 40. The divergent leaf assembly 50 is cooled with an air film of by-passed air or tertiary air introduced into the annulus at the aft end of the convergent section, just beyond the nozzle throat.

The foregoing description of the positions of the nozzle 10 of this invention is to be such that the most efficient nozzle operation occurs. As was first stated within the specification, the pressure of the air leaving the nozzle should be at approximately the same pressure as the ambient. The incorporation of the nozzle 10 of this invention in combination with an aircraft engine with wide Mach number application will optimumly permit exit of the expanding gases from the nozzle at approximately the same pressure as the ambient in all flight modes.

What is claimed is:

1. An exhaust nozzle for an air breathing propulsion system comprising:
    an outer nozzle shell surrounding in a spaced relationship therefrom a center cut-off plug, said plug having an enlarged section, said space between said plug and said shell forming a passage for gas;
    first means to restrict said passage located adjacent said enlarged section, said first means movable by a first actuation means, second means to restrict said passage located adjacent said enlarged section, said second means movable by a second actuation means, said second means located downstream of said first means, said second actuation means being independent of said first actuation means thereby to effect movement of said second means independent of said first means;
    opening means provided within said shell to permit entry of external air into said passage, said second means connected to control the entry volume of air through said opening means;
    said second means not being capable of effecting greater restriction of said passage than said first means;
    said first means effects coverging of the gas within said passage, said second means effects diverging of the gas within said passage, said opening means supplying the external air into said passage between said first and second means.

2. In combination with a jet engine having a combustion chamber, an exhaust nozzle connected to said engine downstream of said combustion chamber, said nozzle comprising:
    an outer nozzle shell surrounding in a spaced relationship therefrom a fixed center plug, said space between said plug and said shell forming a passage for the expanding gases from said combustion chamber;
    first means connected to said shell capable of being moved to convergently restrict said passage, said first means movable by a first actuation means;

second means connected to said shell capable of being moved to divergently restrict said passage, said second means movable by a second actuation means, said second means being located downstream of said first means, said second actuation means being independent of said first actuation means thereby to effect movement of said second means independent of said first means;

opening means provided within said shell to permit entry of external air into said passage, said second means connected to control the entry volume of air through said opening; and said opening means being located adjacent said first means, said opening means to supply the external air into said passage between said first and second means.

3. The combination as defined in claim 2, wherein:

said opening means being capable of not permitting entry of external air into said passage, the entry of air into said passage being automatically controlled by the pressure differential of the gas within said passage and the external air.

4. The combination as defined in claim 3, wherein:

said opening means comprising a plurality of individual blow-in door units.

5. In combination with a jet engine having a combustion chamber, an exhaust nozzle connected to said engine downstream of said combustion chamber, said nozzle comprising:

an outer nozzle shell surrounding in a spaced relationship therefrom a fixed center plug, said space between said plug and said shell forming a passage for the expending gases from said combustion chamber;

first means connected to said shell capable of being moved to convergently restrict said passage, said first means movable by a first actuation means;

second means connected to said shell capable of being moved to divergently restrict said passage, said second means movable by a second actuation means, said second means being located downstream of said first means, said second actuation means being independent of said first actuation means thereby to effect movement of said second means independent of said first means;

opening means provided within said shell to permit entry of external air into said passage, said second means connected to control the entry volume of air through said opening;

said second means not being capable of effecting greater restriction of said passage than said first means; and said opening means being located adjacent said first means, said opening means to supply the external air into said passage between said first and second means.

6. The combination as defined in claim 5 wherein:

said opening means being capable of not permitting entry of external air into said passage, the entry of air into said passage being automatically controlled by the pressure differential of the gas within said passage and the external air.

7. The combination as defined in claim 6, wherein:

said opening means comprising a plurality of individual blow-in door units.

* * * * *